H. BOURN.
Grain-Drill.
No. 66,123.  Patented June 25, 1867.
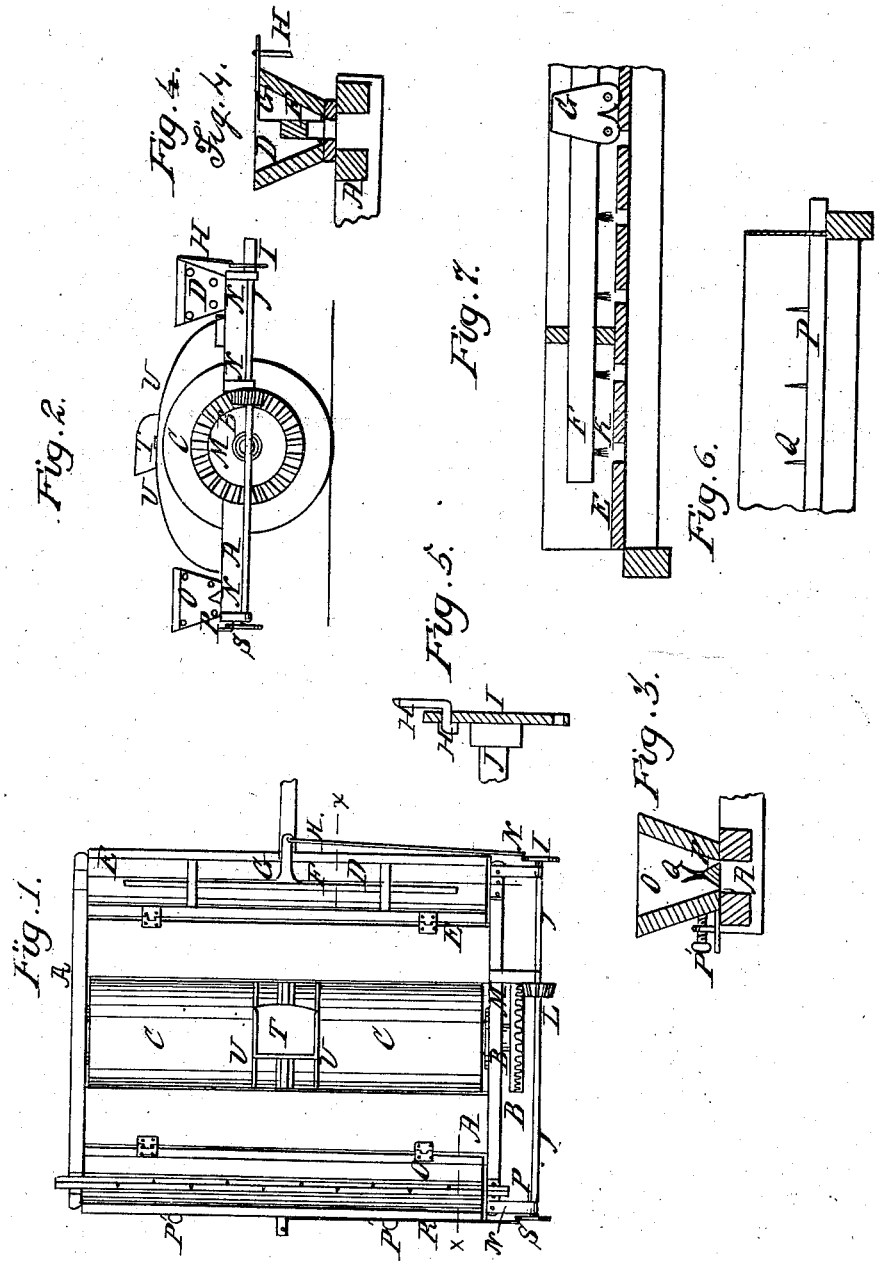

United States Patent Office.

HENRY BOURN, OF MENDON, MICHIGAN.

Letters Patent No. 66,123, dated June 25, 1867.

---

COMBINED SEEDER AND FERTILIZER.

---

*The Schedule referred to in these Letters Patent and making part of the same.*

---

TO ALL WHOM IT MAY CONCERN:

Be it known that I, H. BOURN, of Mendon, in the county of St. Joseph, and State of Michigan, have invented a new and useful improvement in Machines for Sowing Seeds and Fertilizers; and I do hereby declare the following to be a full, clear, and exact description of the same, reference being had to the accompanying drawings, in which—

Figure 1 is a plan view of my machine.

Figure 2, an end elevation of the same.

Figure 3, a cross-section of hopper for fertilizer.

Figure 4, a cross-section of seed-hopper.

Figure 5, a section of crank-wheel I.

Figures 6 and 7 are longitudinal sections of hoppers O and D.

That others may understand my invention, I will particularly describe it.

A A are the timbers forming the main frame, and this is mounted upon the shaft or axle B, which in turn forms the bearing or pivot for the two wheels or rollers C C. Wheels or rollers may be used as desired, it not being always necessary to roll the ground after seed has been deposited. Upon the front of the main frame, and transverse thereof, is the seed-hopper D, extending entirely across the frame from side to side. The sides of the hopper D are converging, being much wider at top than at bottom, and it is provided with a hinged cover to prevent access of dirt or the escape of seed, in transporting the machine from place to place. In the bottom of the hopper are a number of holes, and immediately above this perforated bottom is a slide, E, having corresponding holes, but so arranged that by moving said slide endways, the orifices through the bottom may be wholly or partially closed, and the flow of seed wholly or partially prevented. Immediately above the slide E, but at a distance of some two inches, more or less, is another sliding strip, F, which moves in guides within the hopper, and has an arm, G, attached to its upper surface, which arm curves upward and outward, passing through a recess cut in the top edge of the hopper, beneath the cover. To the lower side of the slide F, at regular intervals, are fixed brushes, K, of stiff bristles, sufficiently long to sweep with their lower ends the upper surface of the slide E. As the machine moves these brushes are caused to move backward and forward, over the orifices of the slide E, and thereby regulate and insure a regular flow of seed through the same. This movement of the slide E is produced by a connecting-rod, H, which connects the arm G with the crank-wheel I, at one end of the shaft J, so that with every revolution of said crank-wheel the slide F is reciprocated back and forth. The shaft J is provided with bevel-pinion L, which gears with the bevel driving-wheel M, secured to the end of the shaft B, and outside of the main frame, so that the shaft J will be caused to revolve whenever the machine is moved forward. Said shaft is supported in bearings at the ends of brackets N N, secured by bolts or otherwise to the main frame. Across the rear end of the main frame is the hopper O, of like size and proportions with the hopper D. It is likewise provided with a cover, but is otherwise differently constructed. In this hopper is to be placed the fertilizer, in the form of dry powder. The sides of the hopper O are made converging, but one of them is not attached to the end-pieces of the hopper, except by hinges of some kind at its upper edge, so that its lower edge may be pressed in more or less, to increase or diminish the width at the bottom. There is no bottom board to the hopper O, but its place is supplied by the moving slide P, which is formed with a triangular cross-section, the apex or edge of the slide being uppermost. This slide is not placed in close contiguity to the front or permanent side of the hopper, but a narrow space is allowed to intervene, through which the fertilizer may pass. The opposite side of the hopper is hinged and is provided with two adjusting-screws, P', by means of which the side board is adjusted inward, more or less, so as to regulate the width of the orifice through which the fertilizer is to flow. On the ridge of the slide P are a large number of pointed spikes, Q, their points uppermost, and these, as the slide P is reciprocated back and forth, break up and more or less agitate the contents of the hopper, and thus secure a constant and uniform flow of the same. The reciprocation of the slide P is effected by means of a connecting-rod, R, similar in its construction and mode of connection with the slide to the connecting-rod H; it is operated by a crank-wheel, S, on the end of the shaft J. It is sometimes desirable to vary the distance through which the slides are to be moved, and this I do by coupling the connecting-rods at different points on the crank-wheels, so as to give the said rods a greater or less lateral motion. This variable connection is made as follows: Several holes are made through the side of the crank-wheel at different distances from its centre. The end of the connecting-rod is bent in the form shown in fig. 5. This mode of connection is very simple and effective, and may be detached with the utmost facility and without the removal of any screws, bolts, or pins. The driver's seat T is mounted upon the striding-bars U U, above the centre of the axle B, and made adjustable forward or backward thereon, so that the machine will be nearly or quite balanced by the driver's weight. The rollers or wheels which support the main frame are both provided with ratchet and pawl connections to the shaft B, so that when the machine is moved backwards the wheels may revolve without revolving the said shaft, and they may also be provided with unshipping devices, by means of which the pawls may be held back from the ratchets, and the wheels thus thrown entirely out of gear with the operative mechanism of the machine during transportation to and from the field, &c.

Having described my invention, what I claim as new, and desire to secure by Letters Patent, is—

1. In combination with the driving bevel gear-wheel M, the shaft J, provided with the bevel-pinion L, and crank-wheels I and S, for the purpose of operating the agitating mechanism in both hoppers from the same shaft, substantially as set forth.

2. The slide F, provided with the brushes K K, and moving the same across the escape orifices in the bottom of the hopper, as and for the purpose set forth.

3. The triangular slide P, placed in the open bottom of the hopper, and nearly filling the area of the same, provided with the spikes Q, as and for the purposes set forth.

4. Hanging one side of the hopper upon hinges or other joints, so that the area of the hopper bottom may be increased or diminished, in the manner and for the purpose set forth.

5. The seat T, adjustable forward and backward, as set forth, in combination with the main frame A and hoppers D O, so that the weight of the driver may be caused to balance the machines, as set forth.

HENRY BOURN.

Witnesses:
 A. J. BENEDICT,
 HENRY S. DOANE.